April 15, 1947. W. L. TODD 2,418,960
SELF CENTERING SCREW
Filed March 8, 1945

*INVENTOR.*
WILLIAM L. TODD
BY *Allen & Allen*
ATTORNEYS

Patented Apr. 15, 1947

2,418,960

UNITED STATES PATENT OFFICE 2,418,960

SELF-CENTERING SCREW

William L. Todd, Fort Thomas, Ky.

Application March 8, 1945, Serial No. 581,608

2 Claims. (Cl. 85—45)

A major difficulty in self centering screws is that they require a special driver, and cannot be actuated by means of a usual flat bladed screw driver.

The object of my invention is to provide a screw which is practical to make, which has a head adapted for use with a special driver which is self centering, but which head can also be used with a regular screw driver. Another ob'ect of my invention is to provide a screw in which the special slotting of the head can be accomplished by the use of milling cutters in a simple and effective manner.

In the accompanying drawings I have illustrated examples of my novel screw as adapted to various types of screws, and these will be described. In the claims that follow, I set forth the novel features of screws of the same or equivalent construction coming within the invention inc'dent to the disclosed prototypes illustrated.

Figure 9:
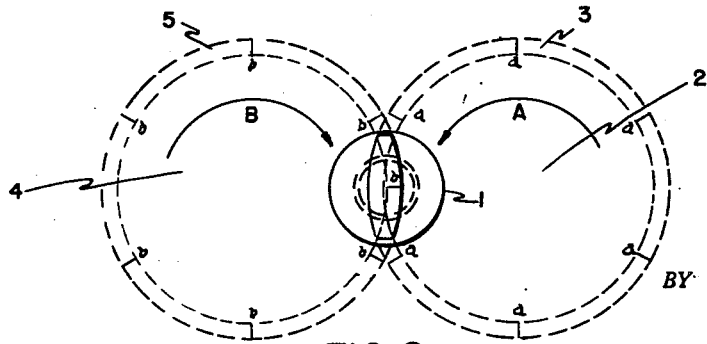
Figure 9 is a diagrammatic view illustrating the milling operation for forming the slot in the screw heads according to my invention.

Referring first to Figure 9, which is not intended as illustrating the only mode of making up new screws, the head of a screw as shown at 1, is placed under a milling cutter 2, having an annular cutting element 3. The cutter is employed to cut a slot in the head of the screw which is a portion of the arc of the annular cutting element. The screw is then placed under another similar cutter 4, having an annular cutting element 5, which is used to cut an intersecting groove in the head of the screw which coincides with the beginning and end of the first cut, but otherwise is on the arc of the second cutter, which while on the same radius as the first cutter, yet intersects the head of the screw from the opposite side.

Figure 10:
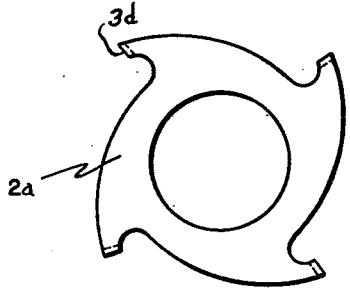
Figure 10 is a plan view of a special cutter.

With cutters such as shown at 2a (Fig. 10), which have cutting teeth 3d; and which are not circular but instead are relieved on the periphery between the teeth, two of them can be used at the same time. This is done by supplying a common drive and indexing the teeth with reference to each other so that they alternately engage the screw head operating otherwise as shown in Fig. 9.

Instead of using two milling cutters, the screw head might be indexed around for one half turn and subjected to the first cutter a second time, with like results.

The slot cut into the screw head by the two cutting operations is a single slot, since the width of the two cuts is such that at the middle of the two arcs all of the metal is removed from the screw head. The resulting slot has narrow ends and a bulged central portion.

Figure 1:
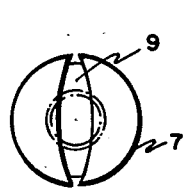
Figure 1 is a plan view of a screw taken from the head thereof, showing my invention.

In Figure 1, the screw, so cut, has a head indicated at 7, a shank 8, and a groove 9, which penetrates into the head for a desired distance (not critical). This groove is curved as to its side walls and is twice as wide at the middle as it is at its two ends. It will be understood that these exact proportions are not essential. The proportions of the groove will depend upon the width of the cutting elements, and the diameters of the same.

Figure 2:
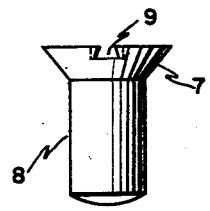
Figure 2 is a side elevation thereof.
Figure 3:
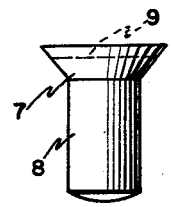
Figure 3 is a side elevation at right angles to Figure 2.
Figure 4:
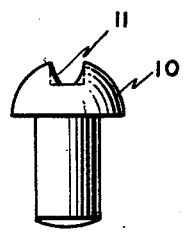
Figure 4 is a side elevation of a screw having a different type head.
Figure 5:
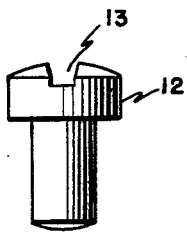
Figure 5 is a side elevation of still another type screw.

Figures 2 and 3 are the same screw as shown in Figure 1, but Figure 4 shows a screw with a different type head 10, same being dome shaped instead of flat on top, but the groove 11 will be alike to the groove already noted in the first type of screw. The same is true for the screw of Figure 5, in which the head 12 is curved off at the top instead of flat but it otherwise is cylindrical. There is no difference in the grooving of this screw, as indicated at 13.

In each of these screws, it will be noted that there is a complete groove entirely across the head of the screw, or in other words, the groove does not terminate inside of the boundaries of the screw head. Hence an ordinary screw driver, while not fully effective, can be thrust into the slot of any of the screws, and will engage the ends of the slot and serve to rotate the screw.

Figure 6:
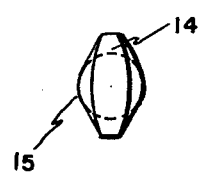
Figure 6 is a plan view of the operating end of a suitable driver for developing the self centering aspect of the screws now shown.
Figure 7:
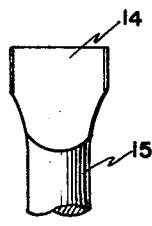
Figure 7 is a side elevation.
Figure 8:
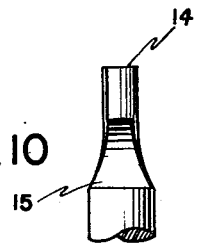
Figure 8 is an edge elevation of the driver of Figure 6.

However, to gain the self-centering effect, the screw is provided with a special driver. In Figure 6 is shown the driver which is shaped at the end, as indicated at 14, to the shape of the slot in the screw. From this end the driver tapers to a usual shank 15. As shown in Figure 8, the tip may project for a substantial distance with the same cross section, a form also shown in Figure 7. However, the end may be somewhat tapering (not shown because the taper will be slight), so that when the driver is inserted in the slot of the screw, there will be frictional resistance to prevent the screw dropping away from the driver. If the driver has a tip of the same cross section throughout, then to frictionally hold the screw on the driver the head is pressed slightly sidewise after engagement, so as to force the end of the screw head groove slightly over the thicker portions of the driver.

It may be noted that there is a true self-centering effect with the screw shown, when employed with a driver having an end of the same shape. However, as also noted the screw can be operated upon by an ordinary driver. Also the feature of frictionally holding the screw on the tip of the special driver can be accomplished by slightly tapering the tip so as to require pushing it into a frictional position before it bottoms in the screw head groove.

By referring to the term screw throughout, I do not wish to exclude bolts of various types which are to be threaded into nuts, or any other similar structure which is to be rotated by means of a driver engaging the head thereof in a suitable groove. All such structures are considered as screws in this specification and in the claims that follow:

Having thus described my invention, what I claim as new and desire to secure by Letters Patent is:

1. A screw having a head, said head having a groove open at its ends at each side of the head so as to be available for an ordinary screw driver, said groove having a central portion wider than its ends and symmetrically tapering to the said ends, for use with a special driver having a blade developed to be alike to the groove, whereby a self-centering of the driver will be obtained, said groove being developed from arcs substantially coinciding where they intersect the ends of the groove, but having centers 180 degrees apart with reference to the screw head.

2. A screw having a head, said head having a groove open at its ends at each side of the head so as to be available for an ordinary screw driver, said groove having a central portion wider than its ends and symmetrically tapering to the said ends, for use with a special driver having a blade developed to be alike to the groove, whereby a self-centering of the driver will be obtained, the said groove having its bottom flat and normal to the axis of the screw, said groove being shaped as from two annular cuts entering the screw head in substantial coincidence but otherwise having their centers at 180 degrees spacing with reference to the axis of the screw.

WILLIAM L. TODD.

REFERENCES CITED

The following references are of record in the file of this patent:

UNITED STATES PATENTS

| Number | Name | Date |
| --- | --- | --- |
| 1,476,653 | Stanton | Dec. 4, 1923 |
| 2,193,477 | DeVellier | Mar. 12, 1940 |
| 2,304,704 | O'leary | Dec. 8, 1942 |